United States Patent [19]

Chung et al.

[11] Patent Number: 4,659,784

[45] Date of Patent: Apr. 21, 1987

[54] BLOCK COPOLYMERS OF N,N-DISUBSTITUTED ACRYLAMIDES

[75] Inventors: David Y. Chung, Edison, N.J.; Lu H. Tung, Midland, Mich.

[73] Assignee: The Dow Chemical Company, Midland, Mich.

[21] Appl. No.: 879,838

[22] Filed: Jun. 27, 1986

Related U.S. Application Data

[63] Continuation of Ser. No. 502,399, Jun. 8, 1983, abandoned, which is a continuation-in-part of Ser. No. 353,723, Mar. 1, 1982, abandoned.

[51] Int. Cl.$^4$ ............................................ C08F 297/02

[52] U.S. Cl. .................................................. 525/294

[58] Field of Search ............... 525/280, 294, 296, 299, 525/314

[56] References Cited

U.S. PATENT DOCUMENTS

3,144,429  8/1964  Strobel .................................. 525/294

Primary Examiner—Paul R. Michl

[57] ABSTRACT

ABA block copolymers containing N,N-disubstituted acrylamides in the A blocks and butadiene polymer in the B block provides thermoplastic elastomer adhesives or compatibilizing agents for polymer blends.

8 Claims, No Drawings

BLOCK COPOLYMERS OF N,N-DISUBSTITUTED ACRYLAMIDES

CROSS-REFERENCE TO RELATED APPLICATION

This is a continuation of application Ser. No. 502,399, filed June 8, 1983, now abandoned, which is a continuation-in-part of the copending application Ser. No. 353,723, filed Mar. 1, 1982, abandoned.

This invention relates to polymers of N,N-disubstituted acrylamides. Polymers and copolymers of N,N-disubstituted acrylamides have been known in the art. U.S. Pat. No. 2,914,498 discloses latex copolymers of vinyl chloride which have been thickened by the use of water-soluble polymers of N,N-dialkylacrylamides. Polymer alloys have been prepared of a vinyl chloride polymer and ethylene dialkylacrylamide copolymers, and are disclosed in U.S. Pat. No. 3,798,289. British Pat. No. 855,741 discloses a polymerization of N-alkyl and N,N-dialkyl as well as N,N-alkylcycloalkylacrylamide derivatives in a hydrocarbon solvent employing an organolithium initiator. British Pat. No. 883,494 discloses the polymerization of N,N-disubstituted acrylamides with various monomers in hydrocarbon solvents or inert ethers using hydrides or organo-metallic compounds of Group 1A of the Periodic Table. The Journal of Polymer Science, Volume XLVIII, pages 357–366, 1960 in a paper by Bulter, Thomas and Tyler, discloses the stereospecific polymerization of some polar vinyl monomers and discusses the anionic polymerization of some N,N-disubstituted acrylamides in various solvents and the physical properties of polymers obtained therefrom. Chemical Abstracts, Volume 70 1969, 29560p discloses that an ethylene N,N-dibutylacrylamide copolymer is obtained by polymerization in hexane using titanium tetrachloride N-butyllithium combination as an initiator. An Alcolac Inc. brochure dated May 1975 entitled SIPOMER NNDMA discloses the polymerization of N,N-dimethylacrylamide by free radical, anionic and cationic initiators. The brochure cites numerous references to the polymerization and end use applications of polymers of N,N-dimethylacrylamide. The known cited art fails to provide any reasonable teaching which would lead one to the preparation of desirable block copolymers of N,N-disubstituted acrylamides with other monomers such as styrene. The relied upon art fails to provide a reasonable suggestion of or a route to a clean, readily reproducible homogeneous polymerization technique which would provide desirable block copolymers of a N,N-disubstituted acrylamide with an anionically polymerizable monomer block.

These benefits and other advantages of the present invention are achieved in a block copolymer, having the configuration ABA wherein the A blocks are individually selected from the group consisting of poly N,N-disubstituted acrylamides, a random copolymer of an N,N-disubstituted acrylamide with a member selected from the group consisting of styrene, vinyltoluene, tertiary-butylstyrene and mixtures thereof, a block copolymer of the configuration DE- wherein D is a block of poly N,N-disubstituted acrylamide and E is a block of a polymer of styrene, vinyltoluene, tertiary-butylstyrene and mixtures thereof with the further limitation that the ratios of N,N-disubstituted acrylamide to a member selected from the group styrene, vinyltoluene, tertiary-butylstyrene and mixtures thereof are from about 1:99 to 99:1; B is a block polymer of 1,3-butadiene, isoprene or mixtures thereof and from 0–15 percent by weight based on the weight of the B block of styrene vinyltoluene tertiary-butylstyrene and mixtures thereof, the block copolymer having a molecular weight as determined by gel permeation chromatography from about 5000 grams per mole to $10^6$ grams per mole and preferably from 50,000 to 500,000, the butadiene content of the block copolymer being 5–95 weight percent based on the total weight of the polymer, and preferably 50–95% by weight based on the total weight of the polymer.

Substituted acrylamide compounds suitable for the practice of the present invention include such material as N,N-dimethylacrylamide, N,N-diethylacrylamide, N,N-dipropylacrylamide, N,N-diisopropylacrylamide, N,N-dicyclohexylacrylamide, N,N-diphenylacrylamide, N-methyl-N-phenylacrylamide mixed hydrocarbyl N,N-disubstituted acrylamides and the like. Anionically polymerizable comonomers suitable for the preparation of A block in the block copolymers in accordance with the present invention include vinyl aromatic monomers such as styrene, vinyl toluene (any isomer); tertiary-butylstyrene (any isomer); methacrylate monomers including methylmethacrylate, ethylmethacrylate, 2-ethylhexylmethacrylate, 2-methylhexylmethacrylate and the like. The proportion of monomers A to B by weight may be from 1:99 to 99:1 depending upon the end use desired.

Nitrogen containing heterocyclic aromatic compounds, which are useful in the practice of the present invention are:

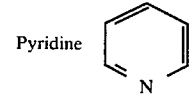

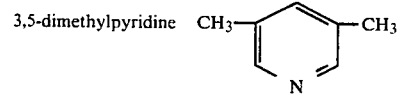

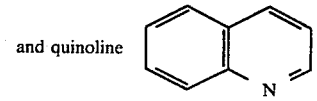

Suitable solvents for polymerization of polymers in accordance with the present invention are aprotic compounds which are generally nonreactive under the conditions of polymerization and include benzene, toluene, xylene; and ethers, such as tetrahydrofuran, dioxane, dibutylether, diethylether and the like. Particularly advantageous are nitrogen containing heterocyclic compounds which include pyridine, 3,5-dimethypyridine, quinoline and the like. Suitable initiators for the anionic polymerization of polymers in accordance with the present invention include organolithium compounds such as butyllithium, secondary butyllithium, sodium alphamethylstyrene dimer and other organo metallic compounds of group 1A of the Periodic Table, as well as organomagnesium compounds. The temperature of polymerization generally for the blocks containing disubstituted acrylamide is from about −80° to 100° centigrade. The selection of the particular temperature range employed will depend upon the reactivity of the particular monomer or mixture of monomers. Block copolymers in accordance with the present invention are readily prepared by the method of U.S. Pat. No. 4,169,115, the teaching of which is hereby incorporated by reference thereto.

The present invention is best illustrated but not limited by the following examples.

EXAMPLE 1

Poly(dimethylacrylamide-b-butadiene-b-dimethylacrylamide) (PDMAA-PB-PDMAA) Triblock Copolymer a. By Anionic Techniques

This triblock was prepared by anionic polymerization techniques in the absence of moisture and oxygen. A dilithium anionic initiator (Li-R-Li) was prepared in accordance to U.S. Pat. No. 4,196,154 (the teaching of which is incorporated by reference thereto) by adding 1.74 millimole (m mole) of secondary butyllithium (sec-BuLi) to 0.83 m mole of 1,3-di(1-phenylethylenyl)benzene (PEB) in 10 milliliter (ml) dry toluene. The dark red mixture was stirred at room temperature for at least two hours until the reaction was completed.

45 Gram (g) of 1,3-butadiene, purified by passing through alumina and ion-exchange resin (DOWEX ® MSC-1-K) columns, was added to 500 ml dry toluene in a reactor under nitrogen atmosphere. The butadiene solution was heated to 50° C. in a water bath and the freshly prepared dilithium initiator was added to initiate butadiene polymerization.

When butadiene was completely polymerized, 250 ml distilled pyridine was added to the polybutadiene dianion solution and the mixture was cooled to room temperature. N,N-dimethylacrylamide (DMAA), 11.5 g was dried with calcium hydride (CaH$_2$) and distilled under nitrogen atmosphere and was diluted with 18 ml distilled pyridine. The DMAA monomer solution was then added dropwise to the polybutadiene dianion solution to form PDMAA-PB-PDMAA triblock copolymer.

Results

| Total Yield | ~50 g (recovered from methanol) |
|---|---|
| Percent Yield | >95% |
| Composition (by NMR) | 93% PB  7% PDMAA |
| Molecular Weight (by GPC) | 87 × 10$^3$ |
| Properties | Cast film is transparent and elastic | b. By Anionic-Free Radical Techniques

PDMAA-PB-PDMAA triblock copolymer was also prepared by anionic-free radical techniques. A dithiol-capped polybutadiene (HS-PB-SH) was prepared by anionic polymerization in accordance to U.S. Pat. No. 4,169,115. 24 g of the dithiol-capped polybutadiene (molecular weight=107×10$^3$ by GPC) was dissolved in 600 ml toluene in a reactor under nitrogen atmosphere. N,N-dimethylacrylamide monomer, 9.6 g, and azo-bis-isobutyronitrile initiator (Vazo 52), 0.35 g, were dissolved in 50 ml toluene and the solution was added dropwise to the polybutadiene solution which was heated to 65° C. in a water bath. After the addition was completed, the reaction mixture was stirred at 65° C. for another 5 hours before the polymer was isolated. Homopoly(N,N-dimethylacrylamide) (~50% homo PDMAA formed) was extracted from block copolymer by acetone.

Results

| # | HS—PB—SH | DMAA | (Crude) Yield | Block Copolymer Composition (by NMR) | | Mol. Wt. (by GPC) |
|---|---|---|---|---|---|---|
| | | | | % PB | % PDMAA | |
| 1 | 24 g | 9.6 g | 32 g | 90% | 10% | 119 × 10$^3$ |
| 2 | 20 g | 19.2 g | 35.5 g | 77% | 23% | — |
| 3* | 20 g | 19.2 g | 38.6 g | 80% | 20% | — |

*DMAA monomer and AiBN initiator solution was added completely at beginning rather than dropwise.

Properties

Cast films from all three block copolymer samples are transparent and elastic.

EXAMPLE 2

Poly[(styrene-co-dimethylacrylamide)-b-butadiene-b-(styrene-co-dimethylacrylamide)] (PS-co-PDMAA)-PB-(PS-co-PDMAA) Triblock Copolymer This triblock copolymer was prepared by anionic polymerization of 1,3-butadiene using dilithium initiator as in Example 1, following by free-radical copolymerization of styrene and N,N-dimethylacrylamide.

After the polybutadiene dianions were prepared as in example 1b, 1.75 m mole of sulfur was added to the dianion solution followed by 5 ml acetic acid to produce α,ω-dithiol-capped polybutadiene (HS-PB-SH).

The α,ω-dithiol-capped polybutadiene, 21.24 g, was dissolved in 600 ml toluene in a reactor and was heated to 65° C. in a water bath. A solution of N,N-dimethylacrylamide monomer (21.6 g), styrene monomer (7 g) and azo-bis-isobutyronitrile initiator (Vazo 52, 0.5 g) in 50 ml toluene was prepared and added dropwise in the polybutadiene solution. The mixture was stirred at 65° C. for 6 hours after adding the monomer/initiator solution to produce the (PS-co-PDMAA)-PB-(PS-co-PDMAA) triblock copolymer.

Results

| Yield | 24.2 g (recovered from methanol) |
|---|---|
| Composition (by NMR) | 82.5% PB  8.9% PS  8.6% PDMAA |
| Properties | Cast film is transparent and elastic. |

EXAMPLE 3

Poly(N,N-dimethylacrylamide-b-styrene-b-butadiene-b-styrene-b-N,N-dimethylacrylamide) Pentablock Copolymer This pentablock copolymer was prepared by anionic sequential copolymerization of butadiene, styrene and N,N-dimethylacrylamide (DMAA). A dilithium anionic initiator (Li-R-Li), 0.69 m mole, was prepared by the same method as described in Example 1a of this disclosure. Butadiene, 46 g, and freshly distilled styrene, 36 g, were added to 600 ml dry toluene in a reactor under dry nitrogen atmosphere. The mixture was heated to 55° C. in a water bath before the freshly prepared dilithium initiator solution was added to initiate the polymerization. Due to reactivity ratio difference, butadiene was polymerized first and then crossed over to styrene to form tapered poly(styrene-b-butadiene-b-styrene) dianions. After the mixture was cooled to room temperature, 150 ml of freshly distilled pyridine was added to break up the association of dianions. A solution of 2.5 ml N,N-dimethylacrylamide in 40 ml of pyridine was added dropwise to the poly(styrene-b-butadiene-b-styrene) dianions to effect the formation of poly(N,N-dimethylacrylamide-b-styrene-b-butadiene-b-styrene-b-N,N-dimethylacrylamide) pentablock copolymer.

Results

| Yield | ~100% |
|---|---|
| Composition | ~56% PB |
| (by NMR) | ~42% PS |
| | ~2% PDMAA |
| Molecular Weight | ~20 × $10^3$ based on polystyrene calibration |
| Properties | Cast film and molded sheet are transparent and elastic |

EXAMPLE 4

Poly(styrene-b-butadiene-b-dimethylacrylamide) Triblock Copolymer

This triblock copolymer was prepared by anionic sequential copolymerization of styrene, butadiene and N,N-dimethylacrylamide (DMAA). Freshly distilled styrene monomer, 33 ml, was added to 500 ml dry toluene in a reactor under dry nitrogen atmosphere. Secondary butyllithium (sec-BuLi), 1.27 m mole, was added to the mixture which was then heated to 45° C. in a water bath for 30 minutes. After the polymerization of styrene was complete, 48 g of butadiene was added to the system to form poly(styrene-b-butadiene) anions. After all butadiene was polymerized, 220 ml freshly distilled pyridine was added to the system. Then 33 ml of N,N-dimethylacrylamide monomer (diluted with 50 ml pyridine) was added to the system to form the poly(styrene-b-butadiene-b-dimethylacrylamide) triblock copolymer.

Results

| Yield | ~115 g (100%) |
|---|---|
| Composition | 28.5% PS |
| (by NMR) | 47.6% PB |
| | 23.9% PDMAA |
| Properties | Cast film is transparent, tough and elastic |

Polymers in accordance with the present invention depending on the diene content are thermoplastic elastomers adhesives and compatibilizing agents for polymer blends.

As is apparent from the foregoing specification, the present invention is susceptible of being embodied wtih various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A block copolymer, having the configuration ABA wherein the A blocks are individually selected from the group consisting of random copolymers of an N,N-disubstituted acrylamide with a member selected from the group consisting of styrene, vinyltoluene, tertiary-butylstyrene and mixtures thereof, and block copolymers of the configuration DE- wherein D is a block of poly N,N-disubstituted acrylamide and E is a block of a polymer of styrene, vinyltoluene, tertiary-butylstyrene or a mixture thereof, with the further limitation that the ratio of N,N-disubstituted acrylamide to a member selected from the group consisting of styrene, vinyltoluene, tertiary-butylstyrene and mixtures thereof in such random copolymers of block copolymers is from about 1:99 to 99:1; B is a block polymer of 1,3-butadiene, isoprene, or a mixture of 1,3-butadiene or isoprene and from 0–15 percent by weight based on the weight of the B block of a member selected from the group consisting of styrene, vinyltoluene, tertiary-butylstyrene and mixtures thereof, the ABA block copolymer having a molecular weight as determined by gel permeation chromatography from about 5000 grams per mole to $10^6$ grams per mole and the content of polymerized 1,3-butadiene or isoprene in the ABA block copolymer being 5–95 weight percent based on the total weight of the ABA block copolymer.

2. The block copolymer of claim 1 wherein the N,N-disubstituted acrylamide is N,N-dimethylacrylamide.

3. The block copolymer of claim 1 having a molecular weight from about 50,000 to about 500,000.

4. The block copolymer of claim 1 wherein the A block is a copolymer of styrene and an N,N-dialkylacrylamide.

5. The block copolymer of claim 1 wherein the block polymer contains from 50 to 95 weight percent of B block.

6. The block copolymer of claim 1 wherein the B block is a polymer of 1,3-butadiene.

7. The block copolymer of claim 1 wherein the A block is a polymer of N,N-dimethylacrylamide and the B block is a polymer of butadiene.

8. The block copolymer of claim 1 wherein the A block is a block copolymer of an N,N-disubstituted acrylamide and styrene.

* * * * *